United States Patent [19]

Hall

[11] Patent Number: 4,647,635

[45] Date of Patent: Mar. 3, 1987

[54] INITIATOR SYSTEMS FOR POLYMERIZATION OF 1,3-DIENES OR COPOLYMERS CONTAINING 1,3-DIENES

[75] Inventor: James E. Hall, Akron, Ohio

[73] Assignee: The Firestone Tire & Rubber Company, Akron, Ohio

[21] Appl. No.: 844,042

[22] Filed: Mar. 25, 1986

[51] Int. Cl.$^4$ ................................. C08F 4/08
[52] U.S. Cl. ............................ 526/181; 526/174; 502/153
[58] Field of Search ........... 526/173, 174, 181, 183; 502/153, 155, 156, 157

[56] References Cited

U.S. PATENT DOCUMENTS

| | | | |
|---|---|---|---|
| 3,742,077 | 6/1973 | Kamienski et al. | 585/438 |
| 3,822,219 | 7/1974 | Kamienski et al. | 502/153 |
| 3,847,883 | 11/1974 | Kamienski et al. | 526/173 |
| 4,429,090 | 1/1984 | Hall | 502/157 |
| 4,429,091 | 1/1984 | Hall | 526/181 |

OTHER PUBLICATIONS

K. Sardelis, et al, Polymer, vol. 25, pp. 1011-1019 (Jul. 1984).

Primary Examiner—Paul R. Michl
Attorney, Agent, or Firm—Frank J. Troy, Sr.

[57] ABSTRACT

A process and a catalyst system is disclosed herein for preparation of medium to high vinyl (co)polymers containing a 1,2-microstructure of between 30 and about 90 percent. The catalyst system which is employed in the production of the (co)polymer is an oligomeric oxolanyl alkane modifier and anionic initiator selected from (1) Na(R)$_3$Mg or (2) Na(R)$_3$Mg and an organolithium compound or (3) K(R)$_3$Mg and an organolithium compound.

17 Claims, No Drawings

INITIATOR SYSTEMS FOR POLYMERIZATION OF 1,3-DIENES OR COPOLYMERS CONTAINING 1,3-DIENES

BACKGROUND OF THE INVENTION

The use of oligomeric oxolanyl alkanes and hydrocarbyl alkali metal compounds such as butyllithium as co-initiators in the copolymerizations of dienes such as butadiene with styrene is well known as disclosed in U.S. Pat. No. 4,429,090 and U.S. Pat. No. 4,429,091 to James E. Hall.

The use of compounds such as $Na(R)_3Mg$ and $K(R)_3Mg$ have been identified as telomerizing agents and catalysts in the polymerization of dienes and diene copolymers.

This invention relates to the use of an oligomeric oxolanyl alkane with (1) $Na(R)_3Mg$ or (2) $Na(R)_3Mg$ and an organolithium compound or (3) $K(R)_3Mg$ and an organolithium compound to initiate polymerization of diene polymers and copolymers, wherein R is an organo radical.

SUMMARY OF THE INVENTION

A process and a catalyst system is disclosed herein for preparation of medium to high vinyl (co)polymers containing a 1,2-microstructure of between 30 and about 90 percent. These (co)polymers are prepared in an inert non-polar solvent from a monomer system which contains at least one 1,3-diene monomer. The catalyst system which is employed in the production of the (co)-polymer is an oligomeric oxolanyl alkane modifier and anionic initiator selected from (1) $Na(R)_3Mg$ or (2) $Na(R)_3Mg$ and an organolithium compound or (3) $K(R)_3Mg$ and an organolithium compound.

DETAILED DESCRIPTION OF THE INVENTION

The process of the present invention for the preparation of polymers from 1,3-diene monomers such as polybutadiene or other (co)polymers formed from at least one 1,3-diene monomer employs a novel catalyst system which produces a (co)polymer which has a 1,2-microstructure ranging between about 30 and 90 percent in the 1,3-diene monomer contributed units.

The polymerization catalyst which is utilized in the present invention is a combination of an oligomeric oxolanyl alkane modifier with an anionic initiator selected from (1) $Na(R)_3Mg$ or (2) $Na(R)_3Mg$ and an organolithium compound or (3) $K(R)_3Mg$ and an organolithium compound.

MONOMER SYSTEMS

The catalyst system of the present invention is used in preparing (co)polymers having a medium to high vinyl content in the 1,3-diene monomers contributed units. Polymerizable 1,3-diene employed in the production of the polymers of the present invention are 1,3-conjugated dienes containing from four to twelve, inclusive, carbon atoms per molecule. Examples thereof include the following: 1,3-butadiene; isoprene; 2,3-dimethyl1,3-butadiene; 1,3-pentadiene(piperylene); 2-methyl-3- ethyl-1,3-butadiene; 3-methyl-1,3-pentadiene; 1,3-hexadiene; 2-methyl-1,3-hexadiene; 3-butyl-1,3-octadiene, and the like. Among the dialkylbutadienes, it is preferred that the alkyl groups contain from one to three carbon atoms. Numerous other suitable dienes are disclosed, in U.S. Pat. No. 3,377,404, the disclosure with respect to which is incorporated herein by reference. The preferred 1,3-diene monomer for use in the present invention is butadiene.

Although butadiene homopolymers or homopolymers prepared from other 1,3-diene monomers are preferred in the practice of this invention, copolymers containing at least one 1,3-diene monomer can be prepared where the comonomers impart desirable properties and do not detract from the polymer properties. Comonomers of different 1,3-diene monomers can be combined in any proportion. The term (co)polymer is defined herein as either a homopolymer or a copolymer formed from at least one diene monomer and optionally one or more copolymerizable monomers.

In addition to the above described conjugated dienes, one or more suitable copolymerizable monomers such as vinyl-substituted aromatic monomers are incorporated into the polymerization mixture. Examples of suitable copolymerizable monomers for use in the preparation of copolymers in the present invention include: styrene; alpha-methylstyrene; 1-vinylnaphthalene; 2-vinylnaphthalene; 1-alphamethylvinyl- naphthalene; 2-alpha-methylvinylnaphthalene; 1,2-diphenyl-4- methylhexene-1; 1,6-diphenyl-hexadiene-1,5; 1,3-divinylbenzene; 1,3,5-trivinylbenzene; 1,3,5-triisopropenylbenzene; 1,4-divinylbenzene; 1,3-distyrylbenzene; 1,4-distyrylbenzene; 1,2-distyrylbenzene; and mixtures of these as well as alkyl, cycloalkyl, aryl alkaryl and aralkyl derivatives thereof in which the total number of carbon atoms in the combined hydrocarbon constitutes generally not greater than 12. Examples of these latter compounds include: 4-methylstyrene; vinyl toluene; 3,5-diethylstyrene; 2-ethyl-4-benzylstyrene; 4-phenylstyrene; 4-p-tolylstyrene; 2,4-divinyltoluene; 4,5-dimethyl-1- vinylnaphthalene; 2,4,6-trivinyltoluene; and 2,4,6-triisopropenyl-toluene. Again reference is made to U.S. Patent No. 3,377,404 for disclosures of additional vinyl-substituted aromatic compounds which are incorporated herein by reference.

When a comonomer system employs one or more copolymerizable monomers other than a 1,3-diene monomer, generally at least one percent preferably at least five percent by weight of the copolymerizable monomers should be used and as much as 90 percent, preferably no more than 45 percent may be used.

The instant monomer reactants are polymerized in a solution polymerization. The solution polymerization takes place in inert organic diluents in which the monomer and catalysts compounds are soluble. Many suitable inert diluents are known in the art and those diluents generally preferred are alkanes or other non-polar solvents. Suitable diluents include but are not limited to ethane, propane, iso- and n-butane, iso- and n-octane, cyclobutane, cyclopentane, cyclohexane, cycloheptane, cyclooctane, benzene and toluene. Preferred diluents are iso- and n-butane, iso- and n-pentane, iso- and n-hexane, iso- and n-heptane. The diluents can be employed either alone or in admixture, e.g., as a hydrocarbon distillate fraction.

The concentration of monomer in solvent ranges from 2 to 50 wt. percent or more and is generally dependent upon economics and the ability to control reaction conditions and to handle the polymer solution. The use of monomer concentrations ranging from between 15 to 25 wt. percent is generally practical.

CATALYST SYSTEM

The catalyst system employed in the present invention is a combination of an oligomeric oxolanyl alkane modifier with an anionic initiator selected from (1) Na(R)$_3$Mg or (2) Na(R)$_3$Mg and an organolithium compound or (3) K(R)$_3$Mg and an organolithium compound.

The oligomeric oxolanyl alkane compounds which are used in the present invention in combination with the other catalyst components are represented by the structural formulas I and II:

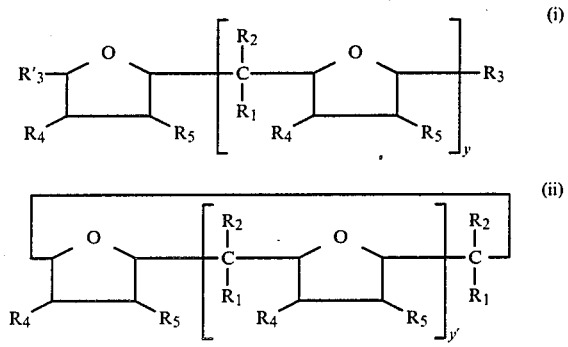

wherein R$_1$ and R$_2$ independently are hydrogen or an alkyl group and the total number of carbon atoms in —CR$_1$R$_2$— is between one and nine inclusive; y is an integer of 1 to 5 inclusive, y' is an integer of 3 to 5 inclusive, R$_3$', R$_3$, R$_4$ and R$_5$ independently are —H or —C$_n$H$_{2n+1}$ wherein N=1 to 6.

While the compounds of structural formula I are linear oligomers and the compounds represented by structural formula II are cyclic oligomers, hereinafter the term oxolanyl modifiers is contemplated to encompass the compounds of both structural formulas.

The oxolanyl modifiers are prepared by methods known to those skilled in the art. Typically the compounds are prepared by reacting furan, which is unsubstituted in either or both of the 2- or 5-positions, with either an aldehyde or a ketone, such as acetone, in the presence of an acid such as hydrochloric acid. Careful control of the reaction parameters allows for the production of a product containing up to 95 percent of dimers, trimers, and tetramers. Once the linear oligomers or cyclic structures are formed these reaction products are hydrogenated in the presence of suitable hydrogenation catalysts such as nickel based catalysts. Any suitable hydrogenation process known in the art may be employed to produce the compounds of structural formulas I or II.

While unsubstituted furans are the preferred reactant, 2-alkyl-furans containing up to six carbon atoms in the alkyl group can be employed in the production of the oxolanyl oligomers of structural formula I. When 2-alkyl-furans are employed in the production of oxolanyl modifiers furfuryl dimers are the main reaction product. The 2-alkyl-furan also may end cap any oligomers formed if furan is used as a coreactant.

The cyclic oxolanyl oligomer modifier precursors are formed only by the reaction of a furan compound which is unsubstituted in the 2,5-position with one or more aldehydes, or one or more ketones, or a mixture thereof.

Suitable oligomeric modifiers for use in the catalyst system include but are not limited to: bis(2-oxolanyl) methane; 2,2-bis(2-oxolanyl) propane; 1,1-bis(2-oxolanyl) ethane; 2,2-bis(2-oxolanyl) butane; 2,2-bis(5-methyl-2-oxolanyl) propane; 2,2-bis(3,4,5-trimethyl-2-oxolanyl) propane. These compounds represent a few of the dimer compounds represented by structural formula I and other linear and cyclic oligomer modifiers are apparent from their structural formulas.

The preferred oxolanyl modifiers for use in the present invention are the dimeric 2,2-bis(2-oxolanyl) propane, which may hereinafter be referred to as OOPS, and the trimeric 2,5-bis(2-oxolanyl-2-propyl) oxolane.

These oxolanyl modifiers are used in conjunction with an anionic initiator system selected from (1) Na(R)$_3$Mg or (2) Na(R)$_3$Mg and an organolithium compound or (3) K(R)$_3$Mg and an organolithium compound.

Any organolithium compounds which are known in the art as being useful in the polymerization of 1,3-diene monomers can be utilized in the instant invention. Suitable catalysts which anionically initiate polymerization of the monomer system include organolithium catalysts which have the formula R'(Li)$_{x''}$ wherein R' represents a hydrocarbyl radical of 1 to 20, preferably 2–8, carbon atoms per R' group, and x" is an integer of 1–4. Typical R' groups include aliphatic radicals and cycloaliphatic radicals, such as alkyl, cycloalkyl, cycloalkylalkyl, alkylcycloalkyl, aryl and alkylaryl radicals.

Specific examples of R' groups for substitution in the above formula include primary, secondary and tertiary groups such as methyl, ethyl, n-propyl, isopropyl, n-butyl, isobutyl, t-butyl, n-amyl, isoamyl, n-hexyl, n-octyl, n-decyl, cyclopentylmethyl, cyclohexyl-ethyl, cyclopentyl-ethyl, methyl-cyclopentylethyl, cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, isopropylcyclohexyl, and the like.

Specific examples of other suitable lithium catalysts include: phenyllithium, naphthyllithium, 4-butylphenyllithium, p-tolyllithium, 4-phenylbutyllithium; 4-butylcyclohexyllithium, 4-cyclohexylbutyllithium, 1,4-dilithiobutane, 1,10-dilithio-decane, 1,20-dilithioeicosane, 1,4-dilithiobenzene, 1,4-dilithionaphthalene, 1,10-dilithioanthracene, 1,2-dilithio- 1,2-diphenylethane, 1,3,5-trilithiopentane, 1,5,15- trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

Mixtures of different lithium catalysts can also be employed, preferably containing one or more lithium compounds such as R'(Li)$_{x''}$. The preferred lithium catalysts for use in the present invention is n-butyllithium.

Other lithium catalysts which can be employed are lithium dialkyl amines, lithium dialkyl phosphines, lithium alkyl aryl phosphines and lithium diaryl phosphines.

The anionic initiation system includes at least one potassium trihydrocarbyl magnesiate or sodium trihydrocarbyl magnesiate. The K(R)$_3$Mg and Na(R)$_3$Mg compounds which are suitable for use in the catalyst system of the instant invention include all potassium and sodium magnesiate compounds in which R represents identical or different C$_2$–C$_{14}$ hydrocarbon organo radical or heterocyclic radical. These C$_2$–C$_{14}$ organo radicals may be alkyl, aryl, cycloalkyl, cycloalkenyl-alkyl, aryl-alkyl, arylcycloalkyl, cycloalkylaryl, or ethylenically unsaturated organo radicals such as vinyl, allyl and propenyl. Heterocyclic radicals which may be employed include 2-pyridyl and 2-thienyl.

The preferred organo radical R which can be employed in the present invention are n-hexyl, n-butyl, s-butyl, and 2-ethylhexyl.

The preferred $K(R)_3Mg$ compounds for use in the present invention include potassium tri-n-hexyl magnesiate, potassium tri-butyl magnesiate, potassium dibutyl hexyl magnesiate and potassium dibutyl 2-ethylhexyl magnesiate.

The preferred $Na(R)_3Mg$ compounds for use in the present invention include sodium tri-n-hexyl magnesiate, sodium tributyl magnesiate, sodium dibutylhexyl magnesiate, and sodium dibutyl 2-ethylhexyl magnesiate.

It is apparent from above examples that since the $(R)_3$ groups in the $K(R)_3Mg$ and $Na(R)_3Mg$ compounds are independent that each $(R)_3$ in fact represents a $R''_1R''_2R''_3$ group in which $R''_1$, $R''_2$ and $R''_3$ are independently selected from the group represented by R, that is, identical or different $C_2$–$C_{14}$ hydrocarbon organo radicals or heterocyclic radicals.

The molar ratio of the oxolanyl modifier to the total anionic initiator can vary from 1.0/20 to 20/1.0, preferably from ½ to 10/1.

In the following discussion the millimoles of anionic initiator is based upon the total lithium, sodium and potassium content in the organolithium, $Na(R)_3Mg$ and $K(R)_3Mg$ initiator compounds present in each catalyst system.

The catalyst mixture of the present invention is employed in amounts designed to result in the desired molecular weight. For example, a polybutadiene of 100,000 $M_n$ would be prepared by charging enough active anionic initiator to react with impurities plus 1.0 mmole of anionic initiator per one hundred grams of 1,3-butadiene. Polymers of from 1,000 $M_n$ to 500,000 $M_n$ can be readily made by one skilled in this technology.

The millimole ratio of the catalyst mixture to the weight of the monomers which is employed in the preparation of the co(polymers) of the present invention is based upon the number of millimoles of the anionic initiator per hundred grams of monomer. The ratio of millimoles of anionic initiator per hundred grams of monomer for use in the present invention ranges between 0.2 millimoles to 100 millimoles, preferably 0.3 millimoles to 3.0 millimoles of anionic initiator per hundred grams of monomer.

The amount of catalyst mixture, as well as the ratio of the oxolanyl modifier to the anionic initiator, employed in producing the (co)polymers of the present invention determine the content of 1,2-microstructure in the 1,3-diene (co)polymer finally produced. It has been determined that the 1,3-diene (co)polymers produced according to the process of this invention should have a vinyl content ranging between about 30 to 90 percent 1,2-microstructure.

All amounts of anionic initiators and oxolanyl modifiers are indicated by moles per grams of monomer or by ratio of components in the instant invention are considered to be catalytically effective amounts, that is, effective amounts for initiating and conducting polymerization of the disclosed monomer systems to produce a (co)polymer containing a 1,2-microstructure ranging between about 30 and 90 percent in the 1,3-diene monomer contributed units.

Process conditions such as the initial and maximum temperature of the polymerization reaction and the absolute concentration of modifier can independently affect the final 1,2-microstructure content of the 1,3-diene (co)polymers. These conditions can be controlled for each monomer reaction system to produce the final desired 1,2-microstructure content of from about thirty (30) to ninety (90) percent. It is desirable to produce polymers and copolymers having a 1,2-microstructure between 35 and 60 percent in the 1,3-diene monomer contributed units.

The term 1,2-microstructure as used in the present invention actually refers to the mode of addition of a growing polymer chain with a conjugated diene monomer unit. Either 1,2-addition or 1,4-addition can occur. In terms of nomenclature this results in 1,2-microstructure for the monomer unit in the polymer chain when 1,3-butadiene is the monomer. When isoprene is the monomer, 3,4-microstructure most generally results with a smaller amount of 1,2-microstructure in the polymer chain. Naming of the polymer structure which results from 1,2-addition is thus dependent on the monomer being polymerized. For simplicity, the term 1,2-microstructure is employed to describe the microstructure which results from 1,2-addition of conjugated dienes.

The polymerization of 1,3-diene monomer in the aforementioned system is preferably effected adiabatically with an increase in temperature occurring during the course of the reaction. As used in the connection the term adiabatic polymerization means that heat is neither supplied or removed during the course of polymerization.

The present polymerization system is applicable to solution polymerization techniques which are conducted at temperatures of 0° C. to 160° C. preferably 90° C. to 160° C. Any temperature in this range of 0° C. to 160° C. which gives a convenient polymerization rate while producing a (co)polymer having a 1,2-microstructure ranging between 30 and 90 percent is acceptable. If the operation is to be conducted as a batch operation, initiation temperatures of less than 0° C. are preferred. If the operation is to be a continuous operation higher initiation temperatures can be employed, such as 100° C. to 120° C. and it is preferred that the polymerization process be maintained in a range of from 90° C. to 160° C. most preferably 115° C. to 140° C.

The polymerization reaction can be performed at pressures between 0.5 and 100 atmospheres. When the desired degree of polymerization has been reached, the (co)polymer can be isolated by precipitation with a non-solvent such as methanol, isopropanol or water and an appropriate antioxidant can be added at this stage of polymerization. Alternatively, the solution can be injected into the slurry tank containing a hot non-solvent whereupon the solvent is flashed off and the (co)polymer remains as a slurry with non-solvent. Alternatively, the solvent can be removed directly by the application of heat and/or flashing to a lower pressure.

Although butadiene homopolymers or homopolymers prepared from other 1,3-diene monomers are preferred in the practice of this invention, copolymers containing at least one 1,3-diene monomer can be prepared where the comonomers impart desirable properties and do not detract from the polymer properties. The number average molecular weight of the final (co)polymer produced can range from 1,000 to 500,000. These (co)polymers depending on their molecular weight and composition can be used for a variety of goods such as tires, and various adhesive applications.

It is believed that one skilled in the art can, using the preceding description, utilize the present invention to its fullest extent. The following preferred specific embodiments are, therefore, to be construed as merely illustrative of the catalyst system and the polymerization process of the present invention.

The polymerization reactions in the following examples were performed individually in 1 gal. stainless steel reactor equipped with a stirrer blade and pressurized. Dry, pure monomer or monomers in hexane were charged in appropriate amounts. In all examples the oligomeric oxolanyl alkane which was employed was 2,2-bis(2-oxolanyl) propane hereinafter referred to as OOPS. In all examples the $K(R)_3Mg$ compound which was utilized was potassium tri-n-hexyl magnesiate. The OOPS and other catalyst compounds were then charged into the reactor after the monomer solutions had been heated to the desired initiation temperature. After polymerizations were complete or a set time had elapsed, the reactions were cooled and discharged into a receiver containing approximately 0.5 percent by weight of an antioxidant, di-tert-butyl-p-cresol (IONOL) and isopropanol to coagulate the polymer product. Polymers were then drum dried to isolate the solids. The 1,2-microstructure of the product polybutadiene or styrene-butadiene rubber was then determined by IR spectroscopy. The mean molecular weights and the average molecular weight to mean molecular weights were determined for the products utilizing G.P.C. techniques.

Also identified in the following examples are the ratios of "O"/"R", "O"/Na and Li/K. The ratio of "O"/"R" represents the ratio of the total oxygen available in milliequivalents from the oligomeric oxolanyl initiator component to the total amount of R and R' groups (hydrocarbon substituents) which are available in the $Na(R)_3Mg$, $K(R)_3Mg$ and R'Li components in milliequivalents. The ratio of "O"/Na represents the ratio of the total oxygen available in milliequivalents from the oligomeric oxolanyl initiator to the milliequivalents of sodium in the $Na(R)_3Mg$ anionic initiator. The ratio of Li/K represents the ratio of lithium in milliequivalents in the organolithium anionic initiator to the potassium in milliequivalents in the $K(R)_3Mg$ initiator.

EXAMPLE 1 and COMPARATIVE EXAMPLES 1A, 1B and 1C

Prepared in accordance with the above procedures Example 1 and Comparative Examples 1A, 1B and 1C displayed in Table I utilized a 1,3-butadiene monomer together with an initiation system of various combinations of: 2,2-bis(2-oxolanyl)propane, potassium tri-n-hexyl magnesiate and n-butyllithium. Parts per hundred grams monomer is abbreviated as phgm. Also identified in the following table are the ratios of milliequivalents of lithium to potassium (Li/K) and of the milliequivalents of oxygen in the OOPS component to the total alkyl groups in the $K(R)_3Mg$ component as "O"/"R".

TABLE I

| | EXAMPLES | | | |
|---|---|---|---|---|
| | 1 | 1A | 1B | 1C |
| REACTANTS | | | | |
| % 1,3-Butadiene/hexane | 11.5 | 11.9 | 11.5 | 11.9 |
| Milliequivalents of | 0.76 | 0.76 | 0.76 | 0.76 |

TABLE I-continued

| | EXAMPLES | | | |
|---|---|---|---|---|
| | 1 | 1A | 1B | 1C |
| "R" ($KR_3Mg$) phgm | | | | |
| Milliequivalents of n-BuLi phgm | 0.25 | 0.25 | 0 | 0 |
| Milliequivalents of "O" in OOPS phgm | 2.0 | 0 | 8.0 | 0 |
| Li/K | 1/1 | 1/1 | 0 | 0 |
| "O"/"R" | 2/1 | 0 | 8/1 | — |
| Reaction Temp. °F. | 207–242 | 207–274 | 207–217 | 206–215 |
| Reaction Time, Hrs. | 1.5 | 2 | 3 | 3 |
| PRODUCTS | | | | |
| % Polymer yield | 92 | 94 | 92 | 90 |
| % 1,2-Microstructure | 40.6 | 12.0 | 25.8 | 24.6 |
| $M_n$ | 205,500 | 222,800 | — | — |
| $M_w/M_n$ | 1.335 | 1.264 | — | — |

EXAMPLES 2–6

In accordance with the above procedures the examples in Table II utilized a styrene butadiene monomer mixture together with an initiation system of 2,2-bis(2-oxolanyl)propane and sodium tri-n-hexyl magnesiates.

TABLE II

| | EXAMPLE NO. | | | | |
|---|---|---|---|---|---|
| | 2 | 3 | 4 | 5 | 6 |
| REACTANTS | | | | | |
| % 1,3-Butadiene/hexane | 6.9 | 6.9 | 6.9 | 6.9 | 6.9 |
| % Styrene | 38.3 | 38.3 | 38.3 | 38.3 | 25.0 |
| Milliequivalent of "R" in $Na(R)_3Mg$ phgm | 0.97 | 0.97 | 0.97 | 1.92 | 0.75 |
| Milliequivalents of "O" in OOPS phgm | 0.49 | 0.97 | 2.0 | 9.6 | 4.5 |
| "O"/"R" | ½ | 1/1 | 2/1 | 5/1 | 6/1 |
| Reaction Temp. °F. | 210 | 210 | 210 | 210–235 | 208–265 |
| Reaction Time, Hrs. | 1 | 1 | 1 | 1 | 1 |
| PRODUCT | | | | | |
| % Yield | 43 | 85 | 92 | 92 | 87 |
| % 1,2-Microstructure | 35.9 | 40.0 | 44.3 | 56.0 | 55.1 |
| % Styrene | 40.0 | 41.9 | 40.6 | 39.5 | 29.2 |
| $M_n$ | 313,100 | 318,800 | 296,800 | 194,300 | 402,400 |
| $M_w/M_n$ | 1.564 | 1.522 | 1.549 | 1.491 | 1.648 |

EXAMPLES UTILIZING $Na(R)_3Mg$, n-BuLi and OOPS INITIATION SYSTEM

In accordance with the above procedures the Examples in Table III utilize a 1,3-butadiene monomer with an initiation system of $Na(R)_3Mg$, n-butyllithium and 2,2-bis(2-oxolanyl) propane. It was determined that $Na(R)_3Mg$ initiators having R groups selected from the group of trihexyl, tributyl, dibutyl hexyl, and dibutyl 2-ethylhexyl provided nearly identical initiator characteristics in the initiator systems of the present invention. Thus the results demonstrated in Table III demonstrate the usage of all compounds represented by the formula $Na(R)_3Mg$ wherein R is represented by the above-identified group of substituents.

In all of the Examples of Table III the ratio of milliequivalents of sodium to milliequivalents of lithium (Na/Li) in the initiator system is 2.0.

TABLE III

| "O"/Na | "O"/"R" | REACTION TEMPERATURE °C. | | | | | |
|---|---|---|---|---|---|---|---|
| | | 5 | 30 | 50 | 80 | 100 | 120 |
| | | Reaction Time | | | | | |
| | | 24 hr. | 24 hr. | 24 hr. | 4 hr. | 1.5 hr. | 0.5 hr. |
| | | % 1,2-Microstructure | | | | | |
| 0 | 0 | — | 21 | 24 | 14 | 15 | 21 |
| 0.5 | 0.15 | 65 | 58 | 48 | 34 | 25 | — |
| 1.0 | 0.3 | 84 | 73 | 62 | 42 | 30 | — |
| 2.0 | 0.6 | 85 | 79 | 71 | 55 | 25 | 35 |
| 4.0 | 1.2 | 85 | 82 | 78 | 63 | 31 | 20 |
| 8.0 | 2.4 | 85 | 77 | 81 | 67 | 45 | 36 |
| 12.0 | 3.6 | — | — | — | — | — | 43 |
| 16.0 | 4.8 | — | — | — | — | — | 49 |

I claim:
1. A catalyst system comprising:
(a) at least one oxolanyl compound selected from the group consisting of:

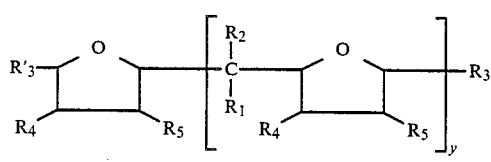

(i)

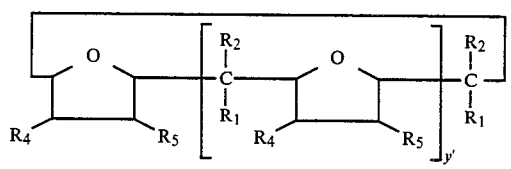

(ii)

wherein $R_1$ and $R_2$ independently are hydrogen or an alkyl group and the total number of carbon atoms in —$CR_1R_2$— ranges between one and nine inclusively; y is an integer of 1 to 5 inclusive, y' is an integer of 3 to 5 inclusive, $R'_3$, $R_3$, $R_4$ and $R_5$ independently are —H or —$C_nH_{2n+1}$ wherein n=1 to 6, and (b) at least one anionic initiator selected from the group consisting of:
(i) $Na(R''_1)(R''_2)(R''_3)Mg$,
(ii) $Na(R''_1)(R''_2)(R''_3)Mg$ and an organolithium compound, and
(iii) $K(R''_1)(R''_2)(R''_3)Mg$ and an organolithium compound, wherein $R''_1$, $R''_2$ and $R''_3$ are independently selected from the group consisting of $C_2$–$C_{14}$ organo radicals, 2-pyridyl and 2-thienyl.

2. The catalyst system of claim 1 wherein the oxolanyl compound is 2,2-bis(2-oxolanyl)propane.

3. The catalyst system of claim 1 wherein the $Na(R''_1)(R''_2)(R''_3)Mg$ compound is selected from the group consisting of sodium tri-n-hexyl magnesiate, sodium tributyl magnesiate, sodium dibutylhexyl magnesiate, sodium dibutyl 2-ethylhexyl magnesiate.

4. The catalyst system of claim 1 wherein the $K(R''_1)(R''_2)(R''_3)Mg$ compound is selected from the group consisting of potassium tri-n-hexyl magnesiate, potassium tributyl magnesiate, potassium dibutylhexyl magnesiate, and potassium dibutyl 2-ethylhexyl magnesiate.

5. The catalyst system of claim 1 wherein the organolithium compound is n-butyllithium.

6. A process for the preparation of a polymer by polymerizing:

(A) 15 to 100 percent of at least one 1,3-diene monomer, and
(B) 0 to 85 percent of one or more reactive monomers which are copolymerizable with said 1,3-diene monomers, in an inert non-polar solvent in the presence of a catalytically effective amount of a catalyst system comprising:
(a) at least one oxolanyl modifier compound selected from the group consisting of:

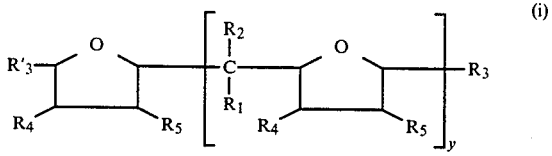

(i)

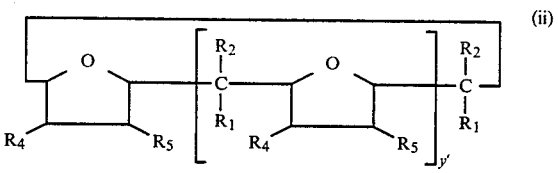

(ii)

wherein $R_1$ and $R_2$ independently are hydrogen or an alkyl group and the total number of carbon atoms in —$CR_1R_2$-ranges between one and nine inclusive; y is an integer of 1 to 5 inclusive, y' is an integer of 3 to 5 inclusive, $R'_3$, $R_3$, $R_4$ and $R_5$ independently are —H or —$C_nH_{2n+1}$ wherein n=1 to 6, and (b) at least one anionic initiator selected from the group consisting of:
(i) $Na(R''_1)(R''_2)(R''_3)Mg$
(ii) $Na(R''_1)(R''_2)(R''_3)Mg$ and an organolithium compound, and
(iii) $K(R''_1)(R''_2)(R''_3)Mg$ and an organolithium compound; wherein $R''_1$, $R''_2$ and $R''_3$ are independently selected from the group consisting of $C_2$–$C_{14}$ organo radicals, 2-pyridyl and 2-thienyl, in which the molar ratio (a) to (b) ranges between 1/20 to 20/1, the millimoles of anionic initiator per 100 grams of the (A+B) monomers ranges between 0.2 and about 100, wherein said polymer contains a 1,2-microstructure in the 1,3-diene monomer contributed units ranging between 30 and 90 percent and has a number average molecular weight ranging from 1,000 to 500,000.

7. The process as in claim 6 wherein the 1,3-diene is butadiene.

8. The process as in claim 6 wherein the diene is butadiene and the reactive monomer is styrene.

9. The process as in claim 6 wherein the oxolanyl compound is 2,2-bis(2-oxolanyl)propane.

10. The catalyst system of claim 1 wherein the oxolanyl compound is 2,2-bis(2-oxolanyl)propane, the anionic initiator is (iii) and the molar ratio of the oxolanyl compound to total anionic initiator ranges from 1.0/20 to 20/1.0.

11. The catalyst system of claim 10 wherein the anionic initiator consists of potassiumn tri-n-magnesiate and n-butyllithium in a ratio such that the milliequivalents of lithium to milliequivalents of potassium is 1/1 and the molar ratio of oxolanyl compound to total anionic initiator ranges from ½ to 10/1.

12. The catalyst system of claim 1 wherein the oxolanyl compound is 2,2-bis(2-oxolanyl)propane, the anionic initiator is (i) and the molar ratio of the oxolanyl compound to anionic initiator ranges from 1.0/20 to 20/1.0.

13. The catalyst system of claim 12 wherein the anionic initiator is sodium tri-n-hexyl magnesiate and the molar ratio of the oxolanyl compound to anionic initiator ranges from ½ to 10/1.

14. The process as in claim 6 for preparation of polybutadiene containing a 1,2-microstructure in the 1,3-diene monomer contributed units ranging between 35 and 60% wherein in the catalyst system the oxolanyl compound is 2,2-bis(2-oxolanyl)propane, the anionic initiator is (iii) and the molar ratio of the oxolanyl compound to total anionic initiator ranges from 1.0/20 to 20/1.0.

15. The process as in claim 14 wherein in the catalyst system the anionic initiator consists of potassium tri-n-hexyl magnesiate and n-butyllithium in a ratio such that the milliequivalents of lithium to milliequivalents of potassium is 1/1 and the molar ratio of oxolanyl compound to total anionic initiator ranges from ½ to 10/1.

16. The process as in claim 1 for preparation of styrene butadiene containing a 1,2-microstructure in the 1,3-diene monomer contributed units ranging between 35 and 60% wherein in the catalyst system the oxolanyl compound is 2,2-bis(2-oxolanyl)propane, the anionic initiator is (i) and the molar ratio of the oxolanyl compound to anionic initiator ranges from 1.0/20 to 20/1.0.

17. The process as in claim 16 wherein in the catalyst system the anionic initiator is sodium tri-n-hexyl magnesiate and the molar ratio of the oxolanyl compound to anionic initiator ranges from ½ to 10.1.

* * * * *